United States Patent [19]

Nakamura et al.

[11] 4,029,020

[45] June 14, 1977

[54] MAGNETICALLY LEVITATED VEHICLE WITH MODULE CONSTRUCTION OF SUSPENSION AND PROPULSION MEANS

[75] Inventors: Shinji Nakamura, Kawasaki; Kiyoshi Mihirogi, Odawara, both of Japan

[73] Assignee: Japan Air Lines Co., Ltd., Tokyo, Japan

[22] Filed: Dec. 15, 1975

[21] Appl. No.: 640,781

[30] Foreign Application Priority Data

Dec. 13, 1974  Japan .......................... 49-142442

[52] U.S. Cl. .................... 104/148 MS; 105/182 E
[51] Int. Cl.² ........................................ B61B 13/08
[58] Field of Search ........ 105/77, 144, 145, 182 R, 105/182 E; 104/23 FS, 118–120, 148 LM, 148 MS, 148 S, 89; 310/12, 13; 248/2, 3, 6, 8, 9

[56] References Cited

UNITED STATES PATENTS

| | | | |
|---|---|---|---|
| 3,460,485 | 8/1969 | Easton | 104/148 LM |
| 3,626,858 | 12/1971 | Colling et al. | 104/148 LM |
| 3,628,072 | 12/1971 | Nicholson | 104/148 LM |
| 3,874,300 | 4/1975 | Payen | 104/148 LM |
| 3,882,790 | 5/1975 | Winkle et al. | 104/148 LM |
| 3,937,148 | 2/1976 | Simpson | 104/148 MS |

*Primary Examiner*—George E. A. Halvosa
*Assistant Examiner*—Galen L. Barefoot
*Attorney, Agent, or Firm*—Armstrong, Nikaido & Marmelstein

[57] ABSTRACT

A magnetically levitated vehicle comprising: a body; and a plurality of modules arranged on said body in close positional relationship in two rows symmetrical with reference to the longitudinal vertical plane traversing the body and each including a frame, one or more attractive electromagnets, a propulsive linear motor and a suspension structure disposed between said frame and the body and including cushioning and shock-absorbing members and link mechanisms for imparting a degree of freedom to the relative movement of the frame and the body, the electromagnets and the linear motor, being fixedly attached to the frame.

5 Claims, 12 Drawing Figures

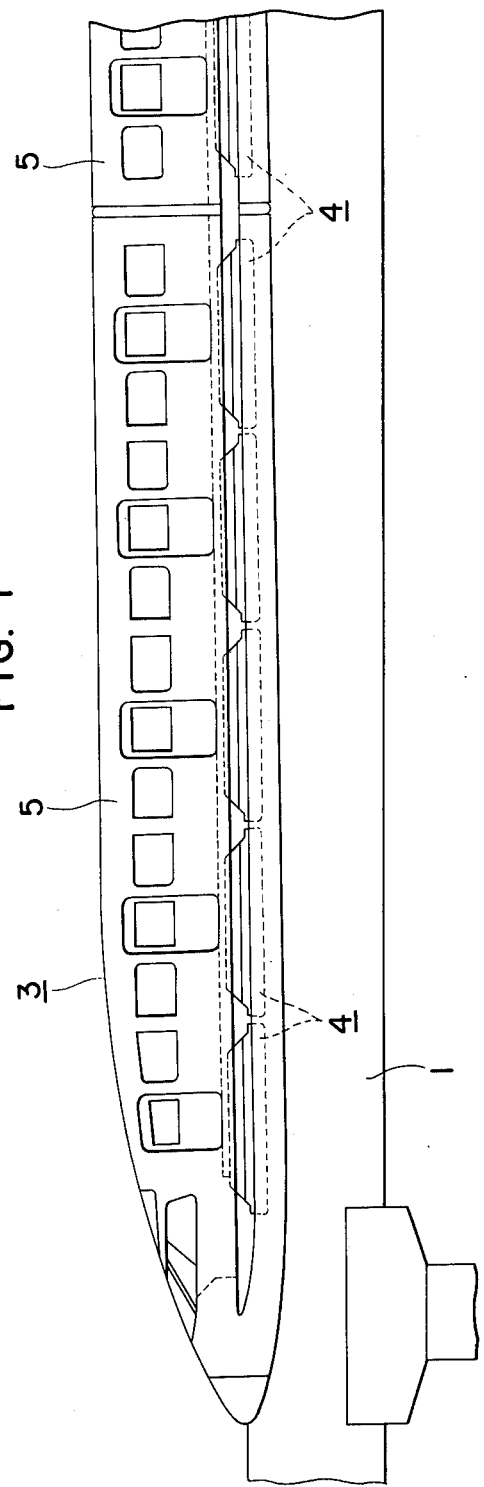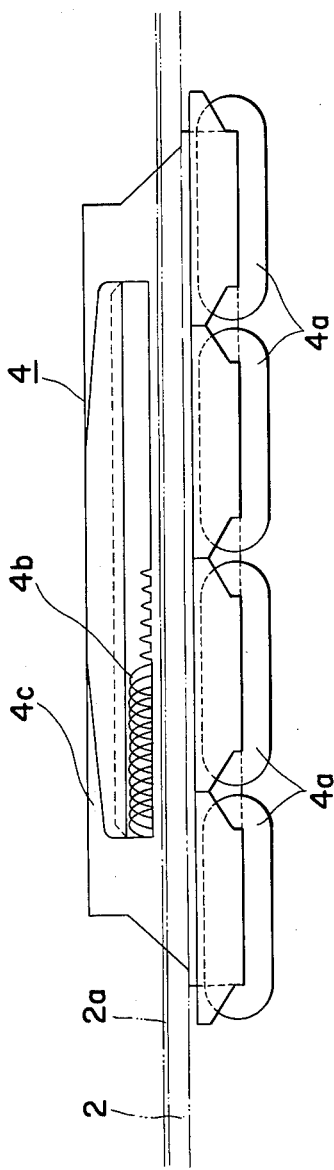

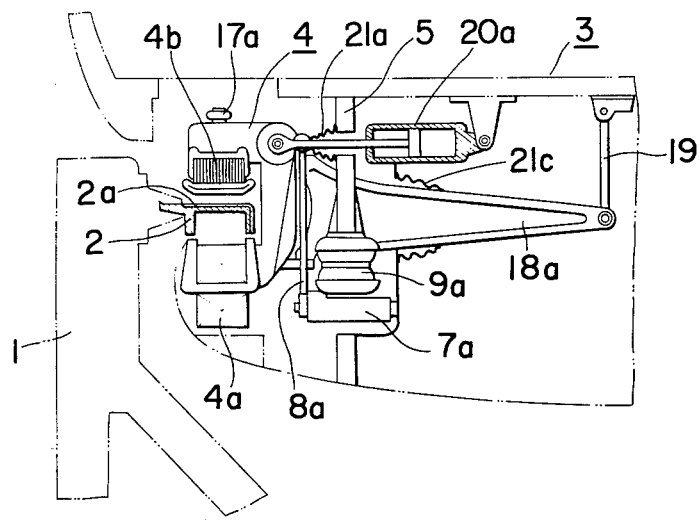
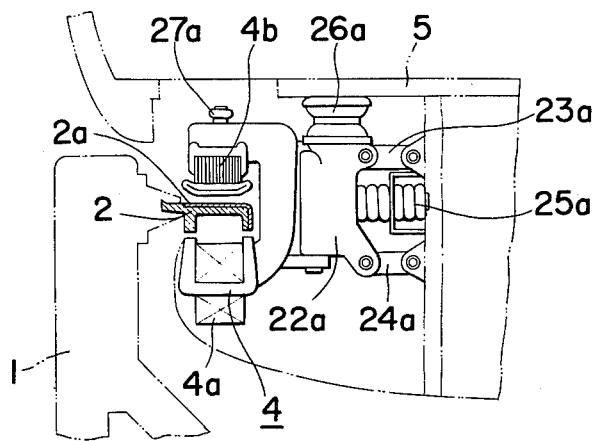

MAGNETICALLY LEVITATED VEHICLE WITH MODULE CONSTRUCTION OF SUSPENSION AND PROPULSION MEANS

The present invention relates to a magnetically levitated vehicle which follows a rail, and more particularly, to a vehicle of the above type in which module constructions of suspension and propulsion means are employed in a manner to follow the rail by the action of the attractive force of electromagnets.

Generally stated, a remarkably large percentage of the construction cost of such transport facilities as above is occupied by the material cost of their steel rails. Therefore, in order to considerably reduce the construction cost of the transport facilities, it is desirable to reduce the cross-sectional area of the rails. However, the excessive reduction in the cross-sectional area would make it impossible to obtain a sufficient lifting force, because each rail constitutes a portion of a magnetic circuit used to levitate the vehicle.

It is, therefore, conceivable as an effective countermeasure taken for ensuring a required sufficient lifting force with such reduced cross-sectional area to provide continuously a number of electromagnets in the vehicle along the rails. In case many electromagnets are provided, however, there is brought about such another problem that freedom of relative movement against the vehicle should be retained so that each of the electromagnets may follow the curvature of the rails.

Accordingly it is an object of the present invention to provide a magnetically levitated vehicle, in which the necessary lifting force can be obtained even with reduction in the cross-sectional area of the rails by densely arranging electromagnets along the whole length of the vehicle, and in which the possible reduction in the lifting force and the possible increase in magnetic drag due to eddy currents induced in the rails can be minimized even at a high speed operation of the vehicle.

Another object of the present invention is to provide an improved vehicle of such type that the electromagnets and the propulsion means such as a linear induction motor are given a freedom with respect to the vehicle so that they can follow sufficiently even irregular portions of the rails, that it is not necessary to employ so high-rigidity body structure, leading to reduction in body weight since the load of the vehicle is distributed over the whole length of the body, and that the necessary lifting force is retained even if some of the electromagnets are in failure.

A further object of the present invention is to provide an improved vehicle of the above character, in which the clearance between the reaction plate and the linear motor can be controlled to an optimum level in accordance with the running condition of the vehicle by fixedly combining the electromagnets and the linear motor into a module construction, thus augmenting the efficiency of the linear motor.

Other objects and advantages of the present invention will become apparent from the following description taken in conjunction with the accompanying drawings, in which:

FIG. 1 is a partial side elevation of a magnetically levitated vehicle propelled by a linear induction motor according to the present invention;

FIG. 2 is an enlarged side elevation of a module used in the vehicle of FIG. 1;

FIG. 8 is a cross-section taken along the line VIII — VIII of FIG. 6;

FIG. 11 is a cross-section taken along the line XI — XI of FIG. 9.

Figure 3:
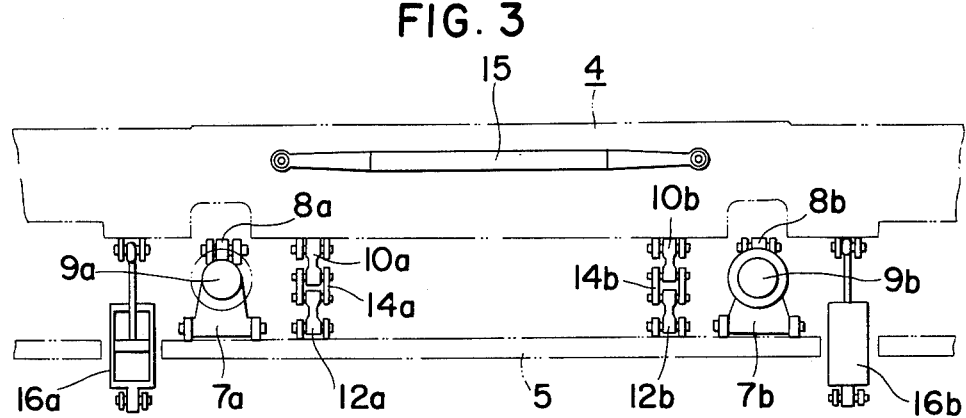
FIG. 3 is a plan view showing one embodiment of a suspension mechanism used in the module of FIG. 2.
Figure 4:
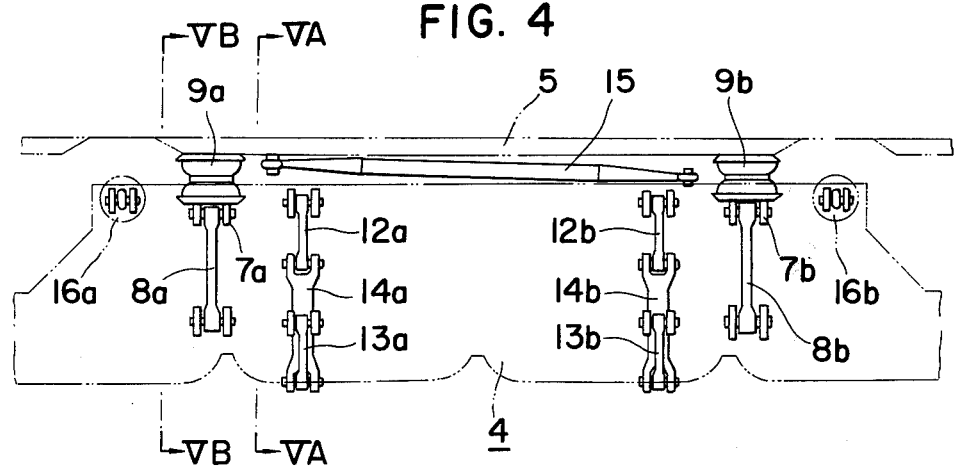
FIG. 4 is a side view of the suspension mechanism of FIG. 3.

The explanation of the present invention will now be made with reference to FIGS. 1 and 2.

Numeral 1 designates an elevated track which is used to support a vehicle 3. Two rails 2 made of steel are fixedly arranged on the elevated track 1 in parallel along the running direction of the vehicle 3. To the upper surfaces of the rails 2 are fixed two electrically conductive reaction plates 2a which are operative to receive the reactions from linear induction motors. Numeral 4 designates a module which is made into a monoblock structure by fixedly combining one or more (four in the shown example) electromagnets 4a and one propulsive linear induction motor 4b by means of a frame 4c. The module 4 thus constructed is fixed to a vehicular body 5 by means of a suspension mechanism, which will be described hereinafter. The number of modules 4 to be mounted in one vehicle body 5 may be several or more, and in this example, the vehicle body is equiped with five modules at each of its right and left sides, namely, with ten modules in total. Each of the modules is levitated in a non-contact fashion above the rails 2 by the attractive forces which are produced between the electromagnets 4a and the rails 2. Moreover, a propulsive force is imparted to the module 4 by the reaction between the linear motor 4b and the reaction plate 2a. Incidentally, it should be noted that the module 4 is floated above the rails 2 always at a predetermined spacing therefrom by detecting at all times during its running operation the spacing between the rails 2 and the electromagnets 4a to control the electric currents to be supplied to the latter.

Referring now to FIGS. 3 to 11a, description will be made of examples of a suspension mechanism which is useful to mount the module 4 on the vehicular body 5 with a sufficient freedom.

Figure 5A:
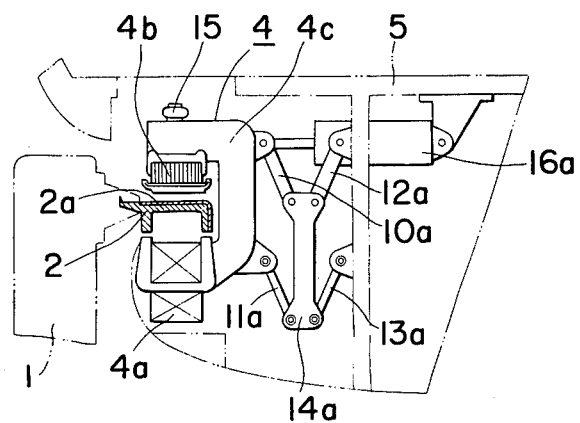
FIGS. 5A and 5B are cross-sections taken, respectively, along the lines VA — VA and VB — VB of FIG. 4.
Figure 5B:
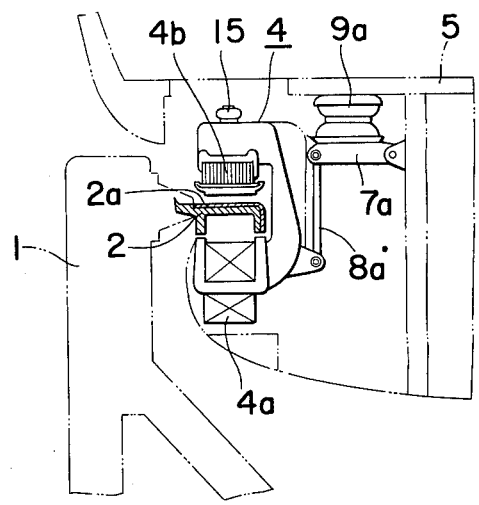

With reference to FIGS. 3 to 5A and 5B, especially, to FIG. 5B, designated at numeral 7a is a link which has its one end pivotted to the vehicular body 5 in a vertically swinging manner. The other end of the link 7a is connected to one end of a link 8a through a spherical joint. The other end of the link 8a is connected to the module 4 through a spherial joint. These two links 7a and 8a thus constitute a first link mechanism and have freedoms for their vertical and transverse displacements between the module 4 and the vehicular body 5. On an intermediate portion of the link 7a which is made transversely immovable, there is mounted an air spring 9a for receiving the vertical load of the vehicular body 5.

Then, a second link mechanism is composed of upper and lower links 10a and 11a which are mounted on the module 4, and upper and lower links 12a and 13a which are mounted on the vehicular body 5. All of these links are connected to an intermediate link 14a, as shown in FIG. 5a. Thus, two link mechanisms of parallelogram are produced, respectively, by the links 10a, 14a and 11a and the module 4 and by the links 12a, 14a and 13a and the vehicular body 5. As a result, the module 4 has a sufficient degree of vertical and transverse freedoms with respect to the vehicular body 5 but is restricted from its rolling motion. In order to allow freedom in pitching and yawing between the module 4 and the vehicular body 5, either the both ends of links 10a and 11a or those of links 12a and 13a should be of spherical joint.

Numeral 15 designates thrust link which is interposed between the module 4 and the body 5. This thrust link 15 has its both ends formed into spherical joints to allow the module 4 to vertically and transversely move with respect to the body 5 but is restricted from its forward and backward movement, thus transmitting the propulsive force and the braking force of the linear motor to the vehicular body 5. Numeral 16a is a double-acting air spring which is operative for transmitting the transverse load to the body 5. The group of mechanism 7a to 16a and another group of mechanism 7b to 16b are symmetrically arranged at front and rear portions of each of the modules 4.

With such structure as described above, the module 4 has freedom with respect to the vehicle body 5 with regard to vertical and transverse motions as well as the possible yawing and pitching motions, so that the module 4 may follow even curved or irregular portions of rails. However it is to be noted that the module is prevented from rolling so that undesired contact of the electromagnets of the module 4 with the rail due to rolling is surely avoided. Such prevention of rolling is important, because the electromagnet in the module has inherently a tendency of rolling. With respect to the degree of freedom of pitching motion, it may be restricted according to necessity.

Figure 6:
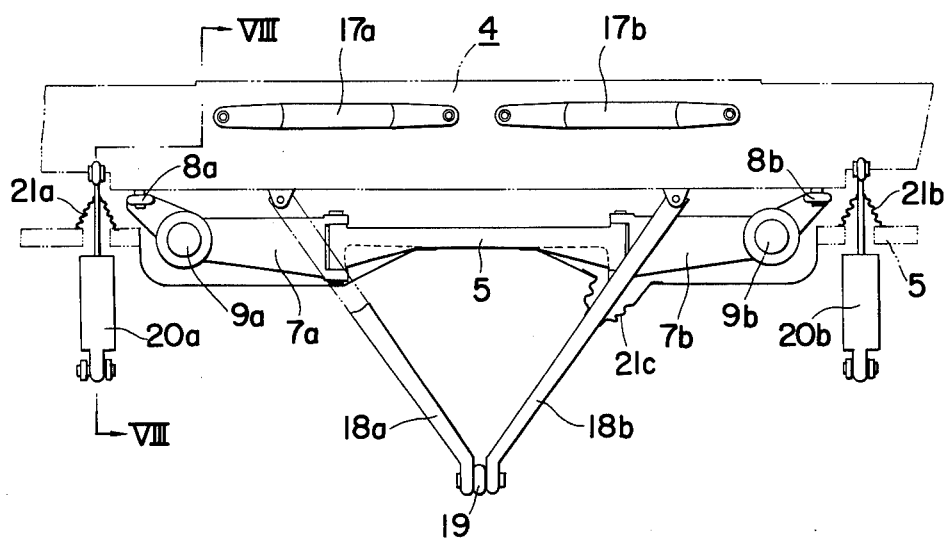
FIG. 6 is similar to FIG. 3 but shows another embodiment of the suspension mechanism.
Figure 7:
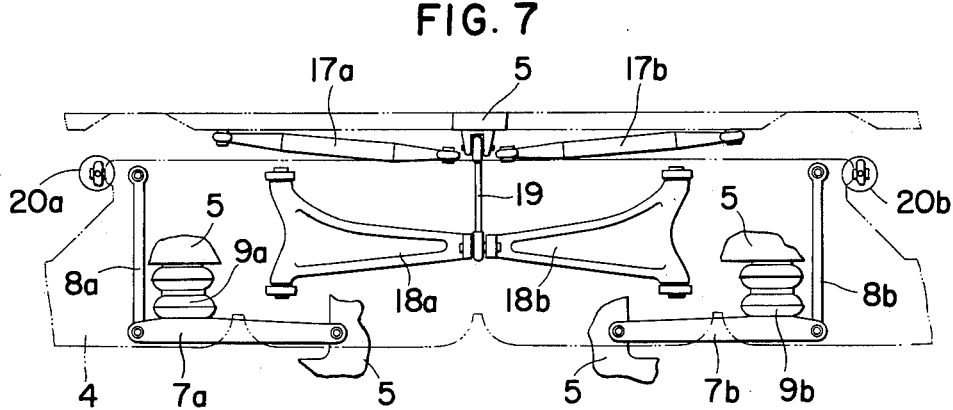
FIG. 7 is a side view of the suspension mechanism of FIG. 6.

Another embodiment of the suspension mechanism will now be described with reference to FIGS. 6 to 8.

Reference numerals 7a, 7b, 8a and 8b indicate links and reference numerals 9a and 9b indicate air springs, all of which are similar to the corresponding parts of the first embodiment shown in FIGS. 3 to 5A and 5B, thus their repeated explanations being omitted here.

Numerals 17a and 17b designate thrust links which are interposed between the module 4 and the vehicle body 5. The both ends of these thrust links 17a and 17b are formed into spherical joints. The thrust links 17a and 17b allow the relative vertical and transverse motions between the module 4 and the body 5 by forming a play at the spherical joint portions, but they restrict the relative forward and backward motions. It should be noted that although two thrust links 17a and 17b are employed in this embodiment for fail safe consideration, even with one of the thrust links 17a and 17b, the objects of the present invention can be attained.

Numerals 18a and 18b designate brackets which horizontally extend towards the center axis of the vehicle body 5 and are at their ends fixedly connected to the frame of the module 4. The other ends of the brackets 18a and 18b are connected to a link 19 through a spherical joint. This link 19 vertically extends and is at its other end connected to the vehicular body 5. Thus, the brackets 18a and 18b and the link 19 constitute a second link mechanism, which allows the relative vertical and transverse motions as well as pitching and yawing motions between the module 4 and the body 5. Incidentally, the rolling motion caused due to the vertical motion is very small and, therefore, is practically negligible. This is so because the lengths of the brackets 18a and 18b are sufficiently large for the distance between the poles of the rails 2.

Numerals 20a and 20b designate double-acting air springs, which are interposed between the module 4 and the body 5 for transmitting the transverse load to the body 5. On the other hand, numerals 21a, 21b and 21c designate sealing bellows, which are provided at the respective links and the air springs so as to prevent water, sand or other foreign substances from stealing into a running electromagnetic device disposed at a lower portion of the body 5. As will be easily understood, all of the above mechanisms are provided symmetrically in each of the modules 4.

As described above, the module 4 has four degrees of freedoms to the vehicle body 5.

Figure 9:
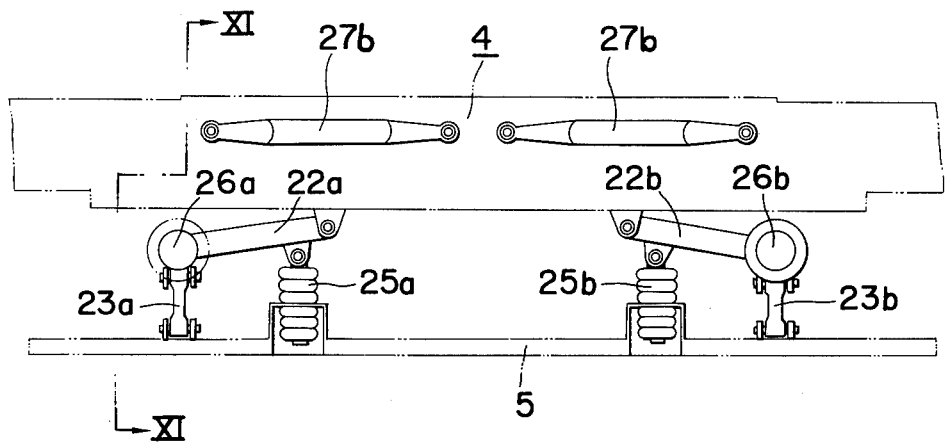
FIG. 9 is also similar to FIG. 3 but shows a further embodiment of the suspension mechanism.
Figure 10:
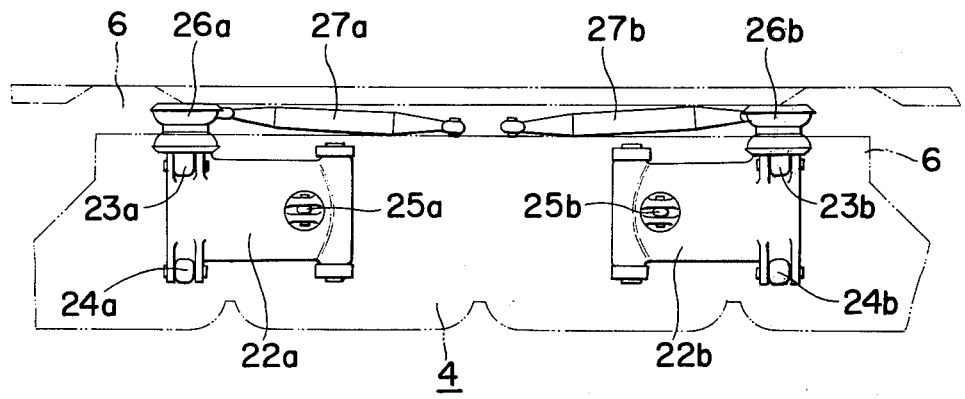
FIG. 10 is a side view of the suspension mechanism of FIG. 9.

A further embodiment of the suspension mechanism will now be described with reference to FIGS. 9 to 11.

Numerals 22a and 22b designate links each of which has its one end pivotally connected to the module 4 so that the links 22a and 22b may be horizontally pivotable. The other ends of the links 22a and 22b are, at their upper and lower portions, connected to links 23a and 24a and to links 23b and 24b, respectively through spherical joints. Thus, the links 22a, 23a and 24a and the body 5 constitute a four-link mechanism of parallelogram while the links 22b, 23b and 24b and the body 5 another four-link mechanism, thus preventing the relative motion between the module 4 and the body 5 from rolling but allowing any other motions between the module and the body.

Numerals 25a and 25b designate double-acting air springs which have their one ends connected to the respective intermediate portions of the links 22a and 22b through spherical joints for transmitting the transverse load to the body 5. The double-acting air springs 25a and 25b are at their respective intermediate portions, connected to the body 5 through spherical joints. Other air springs 26a and 26b are also disposed at upper portions of the ends of the links 22a and 22b, which ends are connected to the links 23a, for transmitting vertical load to the body 5.

Numerals 27a and 27b designate links, which have the same function as described in connection with FIGS. 6 to 8.

As will be apparent, all of the above mechanisms are provided symmetrically in each of the modules 4.

As described above the module 4 has four degrees of freedom to the vehicle body 5.

As described, according to the present invention, since the electromagnets are arranged along the whole length of the vehicle, it should be appreciated that the required lifting force can be obtained even with reduction in the cross-sectional area of the rails. Since, there is little variation in magnetic flux density along the rail, the reduction in lifting force and the increase in magnetic drag due to eddy currents induced in the rails during the high speed operation of the vehicle can be efficiently prevented. Since, according to the present invention, one or more electromagnets and one linear motor are assembled together with the suspension mechanism into one module which is then mounted on the vehicular body, the module can enjoy such a sufficient degree of freedom as to follow the curvature of the rails. The load of the vehicle is distributed over whole length of the body, so that it is not necessary to employ such a high rigidity body structure, leading to reduction in body weight. Since with the present structure, the loads which the respective modules undergo can be suitably controlled, load concentration and the resulted magnetic saturation caused thereby can be easily prevented.

Moreover, due to provision of several or more modules, the overall lifting force will not be affected even if some of the modules are in failure. Since the respective modules have a degree of transverse freedom relative to the vehicular body independently of one another, it should be appreciated as a further feature of the present invention that there is not a requirement for highgrade preciseness in the distance between the left and right hand rails, and hence the fixing structure of the rails can accordingly be simplified, and the maintenance of the rails can be accomplished with ease.

What is claimed is:

1. A magnetically levitated vehicle comprising: a body; a plurality of modules arranged on said body symmetrically in two rows with reference to the longitudinal vertical plane traversing the body, each module including a frame and at least one attractive electromagnet for magnetically levitating said vehicle; and a suspension structure disposed between said body and each said module for connecting said body and said module, said suspension structure including a first link means for preventing rolling motion of said module relative to said body about the longitudinal axis of said electromagnet, and a second link means for preventing the longitudinal movement of said module relative to said body, wherein said first and second link means permit pitch, yaw, vertical and lateral movement of said module relative to said body.

2. A magnetically levitated vehicle according to claim 1, wherein said suspension structure includes a vertical cushioning and shock-absorbing means and a lateral cushioning and shock-absorbing means.

3. A magnetically levitated vehicle according to claim 1, wherein said first link means comprises a first link mechanism including a first link member pivotally connected at its one end to said body and a second link member connected at its one end to the other end of said first link member and at its other end to said frame through spherical joints, respectively; and a second link mechanism including a pair of parallelogrammic link mechanisms having one link member common to each other, one of which mechanisms is connected to said frame and the other of which mechanisms is connected to said body, either of said two parallelogrammic link mechanisms having four connecting joints made through spherical joints and wherein said second link means comprises a thrust link connected between said frame and said body.

4. A magnetically levitated vehicle according to claim 1, wherein said first link means comprises two brackets extending horizontally towards the central axis of the body each bracket fixedly connected at its one end to said frame and at its other end to a common link through a spherical joint, said link vertically extending and being connected at its other end to said body through a spherical joint and wherein said second link means comprises a thrust link connected between said frame and said body.

5. A magnetically levitated vehicle according to claim 1, wherein said first link means comprises a first link member having its one end pivotally connected to said frame so that it is horizontally pivotable and having its other end connected, through spherical joints, to each of a pair of second and third parallel link members which are connected to said body through spherical joints, said first link member extending longitudinally of said body, and wherein said second link means comprises a thrust link connected between said frame and said body.

* * * * *